United States Patent
Ku et al.

(10) Patent No.: US 9,324,367 B1
(45) Date of Patent: Apr. 26, 2016

(54) SMR-AWARE APPEND-ONLY FILE SYSTEM

(71) Applicant: Futurewei Technologies, Inc., Plano, TX (US)

(72) Inventors: Chi Young Ku, San Ramon, CA (US); Stephen Morgan, San Jose, CA (US); Masood Mortazavi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/704,688

(22) Filed: May 5, 2015

(51) Int. Cl.
*G11B 20/12* (2006.01)
*G11B 5/09* (2006.01)
*G11B 5/012* (2006.01)
*G06F 12/10* (2006.01)

(52) U.S. Cl.
CPC ............ *G11B 20/1217* (2013.01); *G11B 5/012* (2013.01); *G11B 5/09* (2013.01); *G06F 12/10* (2013.01); *G11B 2020/1238* (2013.01)

(58) Field of Classification Search
CPC ........... G11B 27/3027; G11B 2220/90; G11B 5/012; G11B 20/10; G11B 20/1217; G11B 20/1252; G11B 2020/1238; G11B 5/024; G11B 5/09; G11B 20/1879; G11B 2220/2516; G06F 11/1469; G06F 3/064; G06F 3/0619; G06F 12/10

USPC ..................................................... 360/31, 48
See application file for complete search history.

(56) References Cited

U.S. PATENT DOCUMENTS

| | | | |
|---|---|---|---|
| 8,756,382 B1 * | 6/2014 | Carlson ................. | G06F 3/0676 711/103 |
| 8,941,936 B1 * | 1/2015 | Smith ..................... | G11B 5/012 360/31 |
| 9,098,451 B1 * | 8/2015 | Rakitzis .............. | G06F 11/1084 |
| 9,117,488 B1 * | 8/2015 | Pantel ................. | G11B 20/1252 |
| 9,153,290 B1 * | 10/2015 | Bandic .................. | G11B 27/36 |

* cited by examiner

*Primary Examiner* — Ali Neyzari
(74) *Attorney, Agent, or Firm* — Futurewei Technologies, Inc.

(57) ABSTRACT

A shingled magnetic recording (SMR) append-only file system includes a disk comprising a plurality of concentric append-only shingled data bands having partially overlapping data tracks, wherein the data bands are associated with a circular linked list having a head data band and a tail data band, the head data band and the tail data band each comprising a plurality of data blocks. The system also includes a processor configured to write data blocks to the disk, and create a new file wherein an empty data band of the plurality of data bands is removed from the circular linked list and added to a single linked list of the new file.

18 Claims, 7 Drawing Sheets

SMR-AWARE APPEND-ONLY FILE SYSTEM

TECHNICAL FIELD

The present invention is directed generally to data storage, and more particularly to SMR-aware append-only file systems.

BACKGROUND

Future disk drives will employ shingled magnetic recording (SMR) technology. SMR is a magnetic storage recording technology used to increase storage density and capacity. SMR drives have the capacity for much higher density, but some shingled bands are configured for append-only. However, host-aware SMR drives have a shingled translation layer (STL) that enables some bands to be used for random write at a modest cost.

SUMMARY

This disclosure is directed to a SMR-aware append-only file system and method thereof.

In one embodiment, a method of using a shingled magnetic recording append-only file system is provided. The method includes a processor writing data blocks to a disk having a plurality of concentric append-only shingled data bands having partially overlapping data tracks, wherein the data bands are associated with a circular linked list having a head data band and a tail data band, the head data band and the tail data band each comprising a plurality of data blocks. The method also includes the processor creating a new file, wherein an empty data band of the plurality of data bands is removed from the circular linked list and added to a single linked list of the new file.

In some embodiments, the method further includes appending a new file data block to the tail data band of the circular linked list, and copying during a transaction, when a number of empty data bands in the circular linked list decreases to a predetermined threshold, the data blocks in the head data band of the circular linked list to the single linked list of the new file to free up data blocks of deleted files and obsolete log blocks in the circular linked list. The segments are appended to the circular linked list and the single linked list sequentially relative to their positions in each of the linked lists. The data blocks are written to the disk in an order according to the sequence they appear in the circular linked list. Modifications to the data blocks and data structures are implemented as transactions, wherein a transaction commit journal entry of the transactions resides in a log block that precedes the free data bands in the circular linked list. Freed data blocks are put to just before the head data band of the circular linked list such that the freed data blocks are unlikely to get re-used before a current log block is full. Undo and redo information is journaled for changes to control data structures, and changes to the segments are not journaled. Changed data blocks are written out before a corresponding transaction commit journal entry. The segments have a fixed size, and the log blocks are flushed asynchronously.

In another embodiment, a shingled magnetic recording append-only file system includes a disk comprising a plurality of concentric append-only shingled data bands having partially overlapping data tracks, wherein the data bands are associated with a circular linked list having a head data band and a tail data band, the head data band and the tail data band each comprising a plurality of data blocks. The system also includes a processor configured to write data blocks to the disk, and create a new file, wherein an empty data band of the plurality of data bands is removed from the circular linked list and added to a single linked list of the new file.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
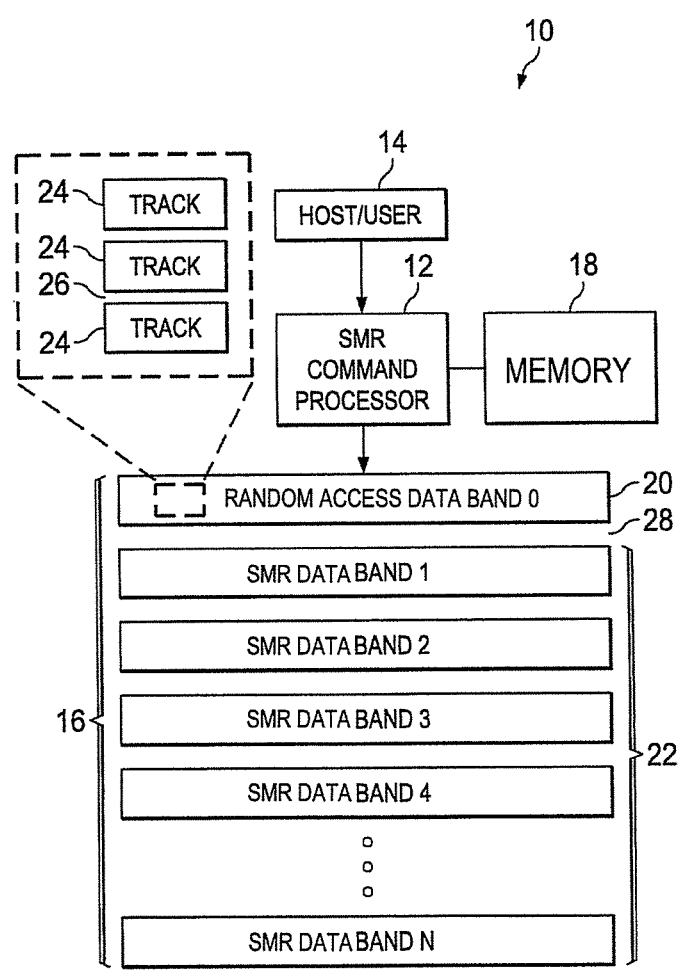
FIG. 1 illustrates an SMR-aware append-only file system according to this disclosure.

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Embodiments of this disclosure provide a file system for host-aware shingled magnetic recording (SMR) drives for which the data portion of the file system is in append-only regions, while the control structures are in random-write regions. The disclosed file system can be used for append only and circularly append only files. Applications for the disclosed embodiments include, but are not limited to, observational data, Log Structured Merge (LSM) trees, and surveillance systems.

The file system of this disclosure is an append-only file system that includes elements related to a log-structured file system (LSFS) and a conventional journaled file system (JFS) implemented on SMR disk drives, but also includes improvements over both LSFS and JFS. Newly arriving data is appended to a circular doubly linked list of large data bands that acts as a log. The data is compacted into files that comprise linked lists of data bands. More particularly, SMR data bands are organized into a circular linked list, and when a new file is created, an empty data band is removed from the circular linked list to form a new list containing a single data band, and this list is associated with the file. In addition, small files that have not been appended for a while are periodically merged into a linked list containing a single data band. New data blocks from different files are appended to the data band at the tail of the circular linked list. Compaction is performed at the head of the circular linked list when the used portion reaches a threshold, whereby valid file blocks belonging to the each valid file are copied to the tail of the file's list of data bands. When a file is deleted, it is marked as invalid and its linked list is reclaimed by moving the data bands to the circular linked list. Data blocks not yet copied to the linked list of the file are marked as invalid in the space management data structure.

When a file reaches its maximum size, appending new data blocks would cause the oldest data block to be marked as invalid. To support circular append files, as all data blocks in the oldest data band in the file's linked list are marked invalid, the oldest data band is moved to become the new tail of the linked list.

Embodiments of this disclosure take advantage of properties of target applications. For example, the LSM tree moves data through a hierarchy of files with increasing size and life span. Therefore, by storing each of them in a separate linked list, the rate of fragmentation is reduced. For observation data, LSM tree files and surveillance video are append-only. Therefore, they are easily compacted into data bands that do not support random updates. Observation data and surveillance video are circular. Therefore, storing each of them in a linked list of data band facilitates easy space management.

The disclosed embodiments provide a number of advantages over the combination of a traditional Linux file system and conventional disks. For instance, there is less disk write head movement because new data for all files are appended to the same data band. Sequential read performance is better because compaction moves blocks belonging to the same file to a linked list of data bands each of which contains contiguous data of that file, and there is more storage capacity per dollar cost because of the use of SMR disks.

The disclosed embodiments also provide a number of advantages over the combination of LSFS and conventional disks. For example, sequential read performance is better because compaction moves blocks belonging to the same file to a linked list of data bands each of which contains contiguous data of that file. A more efficient compaction algorithm takes advantage of the append-only property and the circular nature of data, and more storage capacity per dollar cost because the use of SMR disks.

Advantages of the disclosed embodiments over the combination of LSFS and SMR disks include better sequential read performance because compaction moves blocks belonging the same file to a linked list of data bands each of which contains contiguous data of that file. More efficient compaction algorithm takes advantage of the append-only property and the circular nature of data.

Embodiments of this disclosure are motivated because there are becoming more and more append-only file system applications. This is driven by re-structuring of existing random-update oriented data access techniques into append-only ones (e.g., Log Structured Merge Tree), and the collection of huge amounts of observation data. The more promising disk storage technologies are employing SMR.

There are file systems that only issue append-disk commands, e.g., a Log Structured File System. There are file systems that are optimized for append-only workloads. This disclosure is advantageous because the system is optimized to better take advantage of append-only applications than LSFS. Because files are append-only, optimizations are made in how file data is stored, file system compaction and recovery. The system is optimized to better take advantage of Host-Aware SMR drives than traditional Linux file systems. Because files are append-only, file data is stored in data bands in a way that does not require a SMR translation layer.

Embodiments of this disclosure are well-suited for scenarios in which the life span of data is less than half the time it takes for incoming data to fill half the capacity of the file system. In such scenarios, little or no compaction is needed. Of course, the disclosed embodiments may be utilized in other suitable scenarios as well.

RocksDB Example

RocksDB is an embeddable persistent key-value store for fast storage available from FACEBOOK, INC. RocksDB employs an algorithm similar to a Log Structured Merge Tree algorithm, except that each level includes multiple files of similar size, and files at level L are merged into files at level L+1 or higher.

The files created by RocksDB demonstrate that files are created and deleted repeatedly, that files at a higher level have a longer life span than files at a lower level, and files are appended one-at-a-time. Therefore, executing RocksDB on top of an SMR-Aware Append-Only File system according to this disclosure could result in equilibrium on-disk data structure states. When the file system capacity is more than twice the maximum size of the RocksDB files, all files are deleted before they need to be copied; therefore, there is little need for compaction. Since files are appended one-at-a-time, data blocks of each file are contiguous within each data band. When the file system capacity is less than twice the maximum size of the RocksDB files, the data blocks of files at higher levels are copied to the files' linked lists.

Observation Data Management System Example

An Observation Data Management System circularly appends streams of incoming observation data into files. Assume that data from one stream is stored into a single file, each file has a maximum capacity beyond which older data is discarded, and data arrival rates are different for different streams. Therefore, executing an Observation Data Management System on top of an SMR-Aware Append-Only File system according to this disclosure could result in equilibrium on-disk data structure states.

When the file system capacity is more than twice the sum of the maximum capacity of files, data blocks are invalidated before they need to be copied. There is little need for compaction. Data blocks belonging to the same file are interleaved with data blocks from other files. When the file system capacity is less than twice the sum of the maximum capacity of files, the oldest data blocks for slower streams are copied to their files' linked list and younger data blocks stay in the circular linked list.

Data Structures of an SMR-Aware Append-Only File System

FIG. 1 is an illustration of an SMR-aware append-only file system 10 according to this disclosure. The system 10 uses SMR with a command processor 12. The command processor 12 performs a number of operations and functions such as those described herein. A host or user 14 can be any type of computer and can communicate with the system 10 by any means including through a network. The term "user" herein will be used interchangeably with "host." Multiple hosts 14 can also communicate with the system 10 using conventional techniques. Magnetic thin film coatings are deposited on both upper and lower surfaces of a hard disk (not shown) and a device can also have multiple disks. The films form a plurality of concentric circular data bands 16 that are formatted for use in a SMR architecture and include I-regions, wherein each data band extends radially from a spindle (not shown). Memory 18 (which may include non-volatile flash memory) provides storage of SMR parameter settings and/or SMR status/statistics, but any type of non-volatile storage can be used including the disk media.

Figure 2:
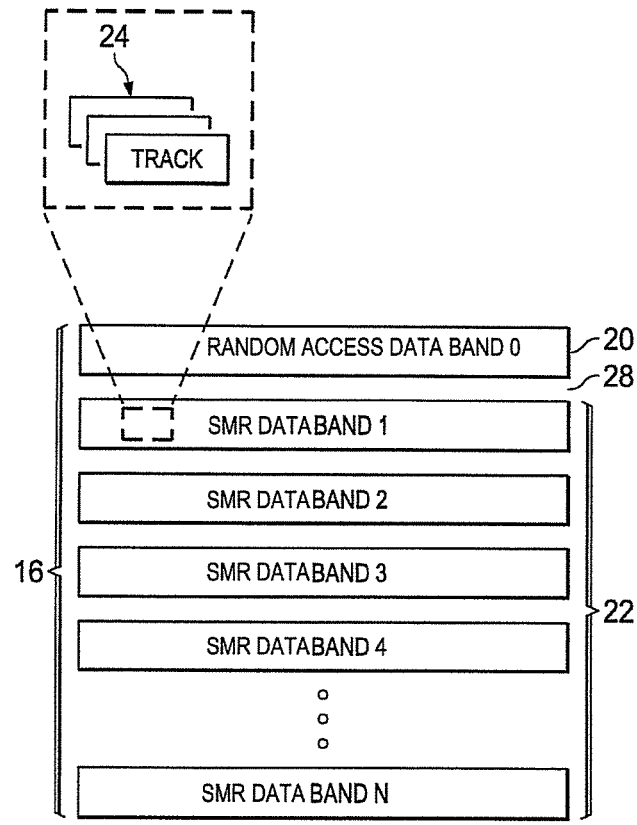
FIG. 2 illustrates an example file system in which subsequent tracks within the same SMR band overlaying each other.

The data bands 16 include random access data bands 20 and SMR data bands 22. In some embodiments, the random access data bands 20 constitute about 1-2 percent of the total storage capacity on a disk. In some embodiments, the SMR data bands 22 are append-only data bands. FIG. 1 shows tracks 24 within band 20 separated from each other by an inter-track gap 26. Data bands 16 are separated by an inter-band gap 28. FIG. 2 illustrates that subsequent tracks 24 within a single SMR band 22 overlay each other like shingles on a roof, hence, the term "shingled magnetic recording".

Figure 3:
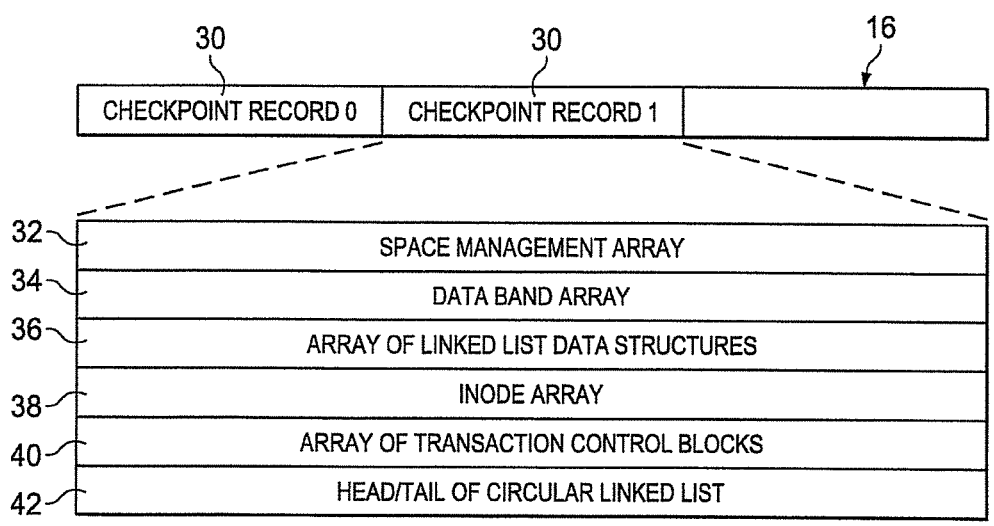
FIG. 3 illustrates on-disk data structures of a random access data band in the SMR-aware append-only file system, according to this disclosure.

FIG. 3 illustrates on-disk data structures of a data band 16 in the SMR-aware append-only file system 10, according to this disclosure. In the example embodiment shown in FIG. 3, two checkpoint records 30 are stored in data band 16. The two checkpoint records 30 alternate to be the current checkpoint. Each checkpoint record 30 includes a number of data structures, including a space management array 32, a data band array 34, an array of linked list data structures 36, an i-node array 38, an array of transaction control blocks 40, and a Head/Tail of circular linked list (CLL) 42.

The space management array 32 contains one entry for each data block in the file system 10. Each entry in the space management array 32 includes an ID of the file this data block belongs to, a bit indicating whether this block is valid, and an index of the next data block for the file.

The data band array 34 contains one entry for each data band 16 in the file system 10. Each entry in the data band array 34 includes an index of the next data band in the list, an index of the previous data band in the list, and a value of a write pointer if the data band is an append-only data band.

The array of linked list data structures 36 includes one or more elements, where each element contains an index to the head data band, an index to the tail data band, and a reference count.

The i-node array 38 includes one entry for each file in the file system 10. Each entry contains a name of the file, an ID of the file, which is the index into the i-node array 38, indexes into the space management array of the first and last data blocks of the file, an index into the array of linked list data structure, where this linked list is where data blocks of the file are copied to during compaction, and other administration information.

The array of transaction control blocks 40 includes one control block for each active operation. This data structure is in memory only. A snapshot of it is saved in the checkpoint record 30.

The Head/Tail of circular linked list (CLL) 42 includes an index into the data band array 34 for the head of the circular data band linked list, and an index into the data band array for the tail of the circular data band linked list.

The data structures 32-42 are referred to as the control data structures. Each checkpoint record 30 includes a copy of the control data structures 32-42 and the Logical Block Address (LBA) of the journal block containing the earliest transaction begin record of active transactions when the checkpoint was taken.

Figure 4:
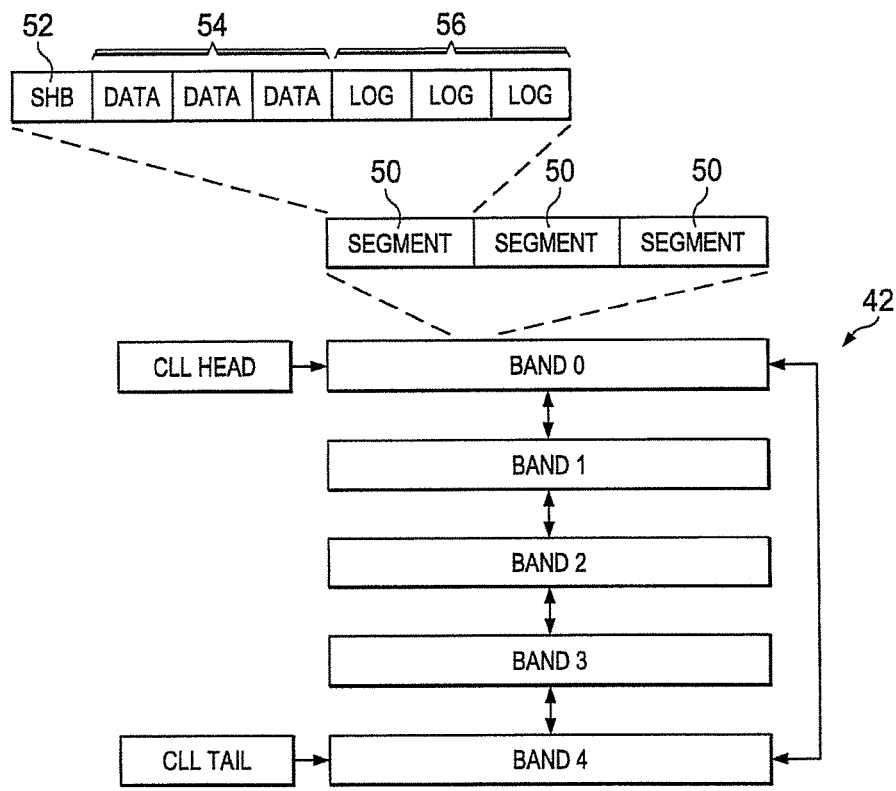
FIG. 4 illustrates a plurality of append-only data bands storing file data blocks and transaction log blocks in the SMR-aware append-only file system, according to this disclosure.

FIG. 4 illustrates a plurality of append-only data bands 22 (such as the append-only SMR data bands 22 of FIG. 1) storing file data blocks and transaction log blocks in the SMR-aware append-only file system 10, according to this disclosure. As shown in FIG. 4, each append-only data band 22 includes an integral number of fixed sized segments 50. Each segment 50 comprises a segment header block (SHB) 52, followed by a sequence of data blocks 54 and/or log blocks 56. The append-only data bands 22 store the file data blocks 54 and transaction log blocks 56. The data blocks 54 are grouped into the fixed size segments 50. The SHB 52 contains a directory of data blocks 54 contained within the segment 50. While FIG. 4 illustrates a segment 50 having three data blocks 54 and three log blocks 56, it will be understood that a typical segment 50 would include more data blocks 54 and log blocks 56.

In some embodiments, a SHB 52 is 4,096 bytes in length and further comprises a 64-bit magic number identifying the type of block as a SHB, a 64-bit sequence number, a 64-bit checksum of the SHB, a 64-bit size of the segment (in bytes), and an index of the blocks in the segment. The index further comprises a 64-bit count of the number of blocks in the segment, and an array of 254 entries, each of which further comprises a 64-bit file identity field and a 64-bit file block field. The file identity field indicates the contents of the corresponding block, and contains either a (−1) indicating a 512-byte LOG block, the ID of the file to which the block belongs, indicating a 4,096-byte data block, or a (−2) indicating padding to the end of the SHB. If the file identity field contains the ID of the file to which the block belongs, the file block field contains the index of the block within the file. Otherwise, this field contains (−1).

Note that in this scheme, log blocks are fixed size (e.g., 512 bytes), so consideration is given to how to pack data into that size or use continuation log blocks. This could become an issue if, for example, long file names are allowed for rename. In some embodiments, a band is fully packed with segments, even if this means the last segment header block contains only padding.

In some embodiments, the file system 10 also includes a file path lock table. The file path lock table is a data structure that is in memory only, i.e., not in the checkpoint record 30.

According to one illustrative embodiment, there is one type of journal record for each atomic file system transition. The journal record types may include one or more of the following:

1) Append a data block 54 to the data band at the tail of the circular linked list 42.
2) Remove an empty data band 16 from the head of the circular linked list 42 and add it to the tail of a file's linked list.
3) Remove an empty data band from the head of a file's linked list and move it to right after the tail of the circular linked list 42.
4) Move a data block 54, belonging to a file, from a source data band to a destination data band.
5) Mark a data block 54 of a file as invalid.
6) Change the single linked list 58 of a file to a different single linked list.
7) Allocate an i-node.
8) De-allocate an i-node.
9) Associate a file with a single linked list 58.
10) Dis-associate a file from a single linked list 58.
11) Transaction begin record.
12) Transaction end record.

Journal records are buffered in a data block. Flushing of the transaction end record commits the entire set of operations comprising the transaction. If the transaction never ends, the operation journal records can be flushed to disk, but they may have to be undone by log redo—in some embodiments, the records cannot be made permanent. Only after the transaction end record hits the log can log redo allow the changes implied by the operations to reach the home locations on disk. Thus, it is allowable to flush parts of a transaction to the log without waiting for the transaction end record to be flushed to the log. Either the transaction end record will eventually be flushed to the log, in which case the transaction can be said to have committed, or the transaction will have failed and will have to be undone.

Method of Implementation

Figure 5:
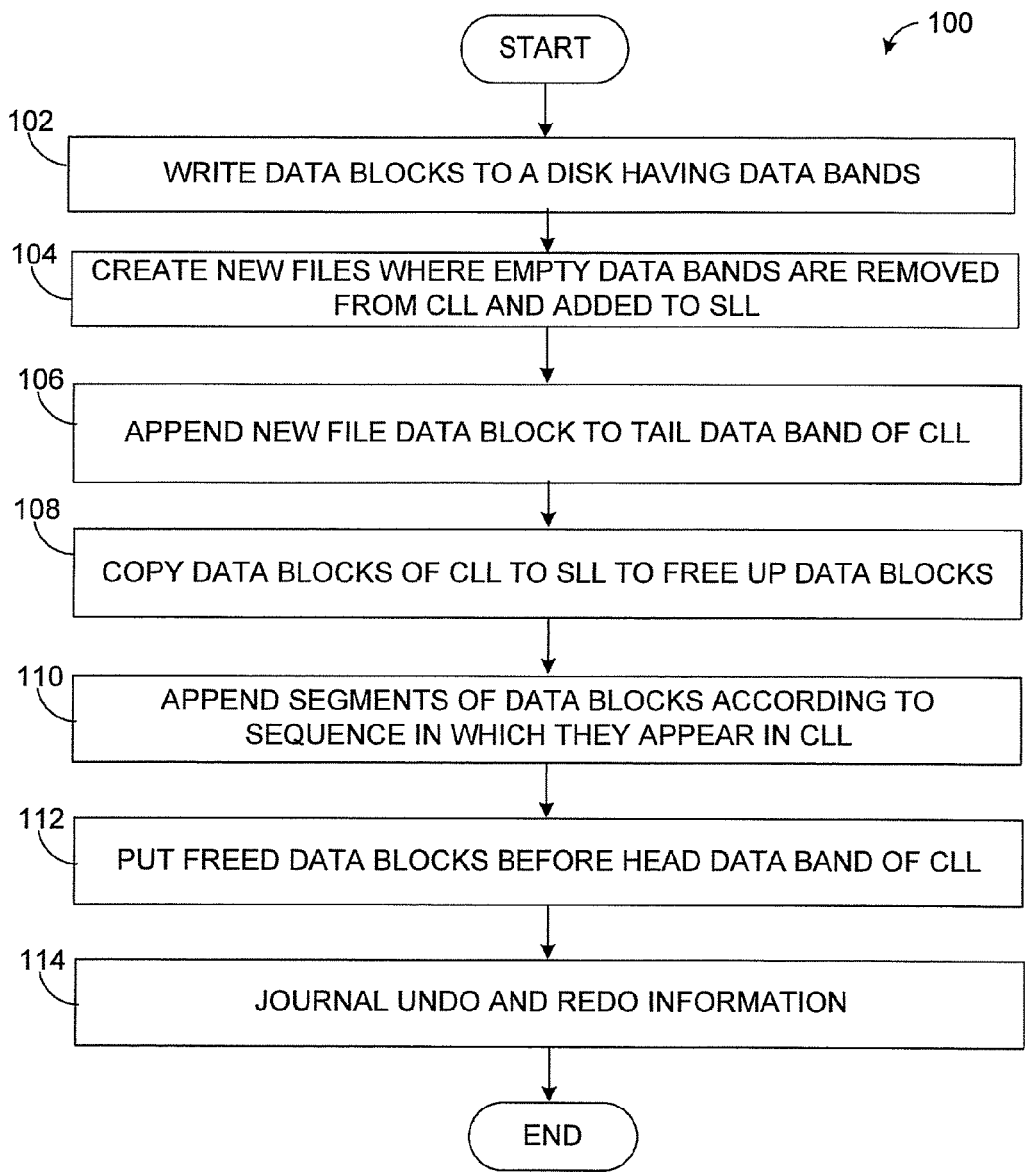
FIG. 5 illustrates an example for using a shingled magnetic recording append-only file system according to this disclosure.

Referring to FIG. 5, there is shown an example method 100 for using a shingled magnetic recording append-only file system 10 according to this disclosure. The method 100 is described as being performed by the processor 12. Of course, the method 100 can be performed by any other suitable device and in any other suitable system.

At step 102, the processor 12 writes data blocks 54 to a disk having a plurality of concentric append-only shingled data bands 16 having partially overlapping data tracks 24. The data bands 16 are associated with the circular linked list 42 having the head data band and the tail data band each comprising data blocks 54. All append-only data bands 22 initially are associated with the circular linked list 42 and are empty.

Figure 6:
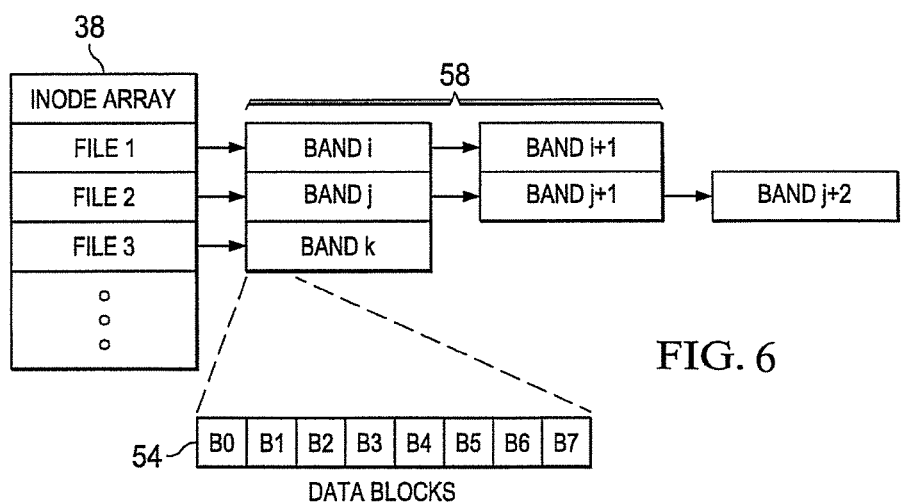
FIG. 6 illustrates an i-node array showing a single linked list (SLL) and data blocks according to this disclosure.

At step 104, the processor 12 creates a new file, and removes an empty append-only data band 22 from the circular linked list 42 and adds it to the file's single linked list (SLL). For example, FIG. 6 shows an i-node array 38 that includes a plurality of files (e.g., FILE1, FILE2, FILE3, etc.). Each of the files includes one or more bands that make up the SLL 58 for that file. For example, the SLL 58 for FILE1 includes BAND i and BAND i+1. In FIG. 6, FILE 3 is created as a new file in the i-node array 38. BAND k, which is an empty append-only data band comprising a plurality of data blocks 54, is then added to the SLL 58 of FILE 3.

Figure 7:
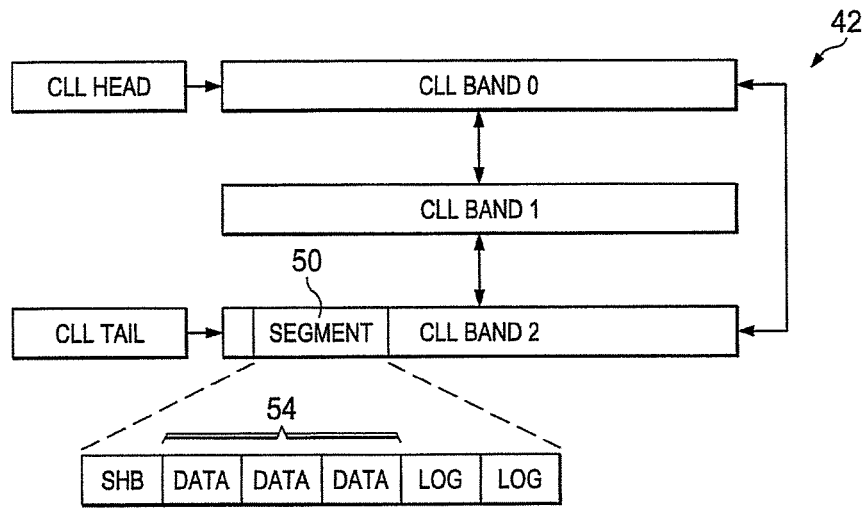
FIG. 7 illustrates a new file data block appended to the tail data band of the circular linked list according to this disclosure.

At step 106, the processor 12 appends a new data block 54 to the tail data band of the circular linked list 42. For example, FIG. 7 shows a circular link list 42 with three bands: CLL BAND 0, CLL BAND 1, and CLL BAND 2. CLL BAND 0 is the head data band of the circular linked list 42, and CLL BAND 2 is the tail data band. The new data block 54 is appended to a segment 50 of CLL BAND 2. As some files grow and some files get deleted, there are fewer empty data blocks 54 on the circular linked list 42.

Figure 8:
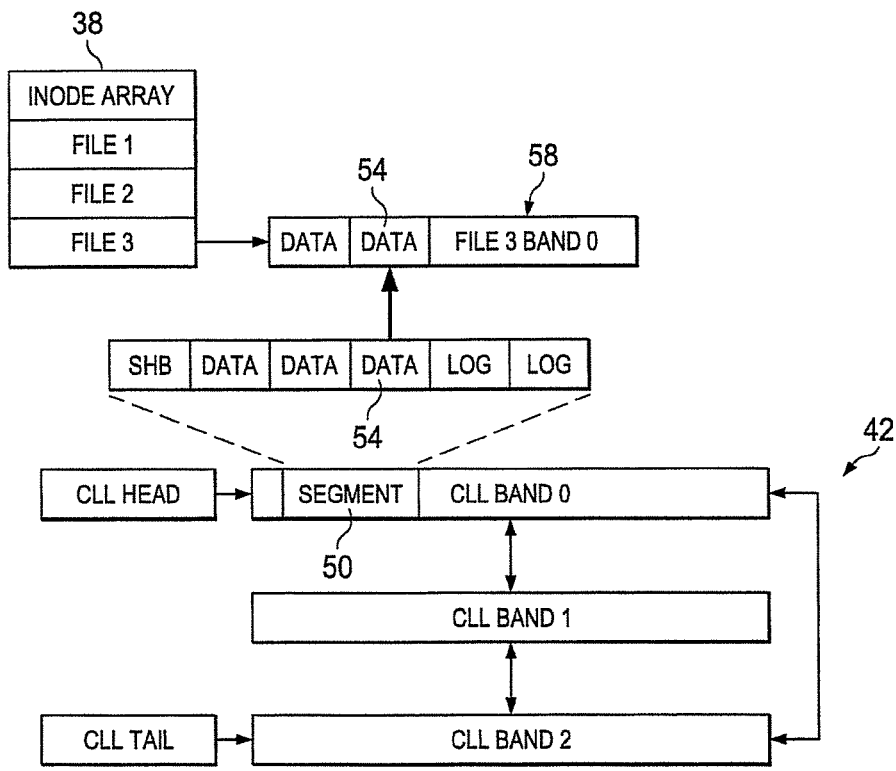
FIG. 8 illustrates an operation of copying data blocks in a head data band of the circular linked list when the number of empty data bands on the circular linked list decreases to a predetermined threshold, according to this disclosure.

At step 108, when the number of empty data blocks 54 on the circular linked list 42 decreases to a predetermined threshold, the processor 12 copies one or more data blocks 54 in the head data band of the circular linked list 42 to the single linked lists 58 of one or more files to free up data blocks of deleted files and obsolete log blocks in the circular linked list 42. For example, FIG. 8 shows a data block 54 in CLL BAND 0, which is the head data band of the circular linked list 42. The data block 54 may represent a data block of a deleted file or an obsolete log block. The data block 54 is copied from CLL BAND 0 to FILE 3 BAND 0, which is a band in the SLL 58 for FILE 3. This can then free up space in CLL BAND 0. While FIG. 8 shows just one data block 54 being copied, it will be understand that more than one data block 54 can be copied at a time.

At step 110, the processor 12 first builds a segment 50 in memory 18, and then appends the segment to the tail data band of the circular linked list 42. Segments 50 are appended to the circular linked list 42 and single linked list 58 sequentially relative to their positions in each of the linked list. This sequential write ordering is created because append-only data bands 22 do not allow writing out of order. In addition, this write ordering precludes the possibility that a data block 54 freed in a previous transaction would need to be restored because the transaction got rolled back (this is possible when the transaction commit record did not get flushed or it was flushed to a partially constructed segment) but the append-only data band 22 has been overwritten by a subsequent append operation.

This implies that the transaction commit journal entry of the transaction that freed an append-only data band 22 needs to reside in a log block that precedes the free append-only data bands 22 in the circular linked list 42. Therefore, at step 112, the processor 12 puts newly freed data blocks 54 just before the head of the circular linked list 42, so that the blocks are unlikely to get re-used before the current log block is full.

Each file is associated with an i-node in the array 38. An i-node includes administrative information about a file, the single linked list the file's data blocks are copied to, and a list of space management array entries, arranged in the order of the data blocks in the file. When a file is created, a free i-node and a free single linked list are allocated. When a data block 54 is appended, the corresponding space management array 32 element is added to the file's space management array entry linked list. When a file is deleted, its i-node is marked as free, the file is disassociated from the single linked list 58, and all space management array 32 entries are marked as free.

When a file has not been appended for a predetermined period of time and the file is small, its data blocks 54 are copied to a single linked list 58 shared with other small files, and then reassigned to this shared single linked list. When a file is deleted and there is no other file sharing the single linked list 58 with it, the data bands 16 on this list are freed to the circular linked list 42.

At step 114, the processor 12 makes modifications to the file data and data structures 54, which are implemented as transactions, such as using 2-phase locking. The processor 12 journals undo and redo information for changes to the control data structures. However, the processor 12 does not journal changes to the segments 50. Changed data blocks 54 are written out before a corresponding transaction commit journal entry. Moreover, since segments 50 are of fixed size, log blocks are flushed asynchronously. Therefore, a transaction could complete its changes to the in-memory data structures and segments that got rolled back after a crash because the segment containing the transaction commit record was only partially constructed or written to disks.

An implication of such transaction processing approaches is that segments 50 containing changes associated with a journal entry need to be appended to disks before the journal entry. Therefore, the journal entry would need to be contained in a log block succeeding the data blocks 54 that are appended. Moreover, journal entries for a transaction freeing data bands 16 need to reside in a log block preceding the data blocks 54 residing in the free data bands.

The processor 12 may perform periodic checkpointing by recording the log sequence number (LSN) of the on disk log tail, suspending processing new transactions, waiting until all atomic transactions complete, choosing the current checkpoint record and write all control data structures to disk, truncating the transaction log to the smaller of the recorded LSN and LSNs of transaction begin records of all active transactions, and resuming processing of transactions.

When a user initiated shutdown is started, the processor 12 stops processing new transactions, waits for active transactions to complete, pads the current segment to full size and appends it to disks, initiates checkpointing, and waits for it to complete.

After a system crash, the processor 12 performs recovery processing before normal processing by reading the control data structures from the current checkpoint. The processor 12 starts from the LSN associated with the checkpoint, reads segments sequentially one at a time, verifying that it is complete, then re-logs the journal entries in each log block of the segment 50, and stops when encountering the first incomplete segment. Then, the processor 12 performs an undo of each active transaction. Later, the processor 12 initiates checkpointing and waits for it to complete. If the system crashes again during recovery processing, the processor 12 starts the process over. Therefore, the processor 12 either requires the redo or undo to be idempotent or writes compensation journal entries.

Figure 9:
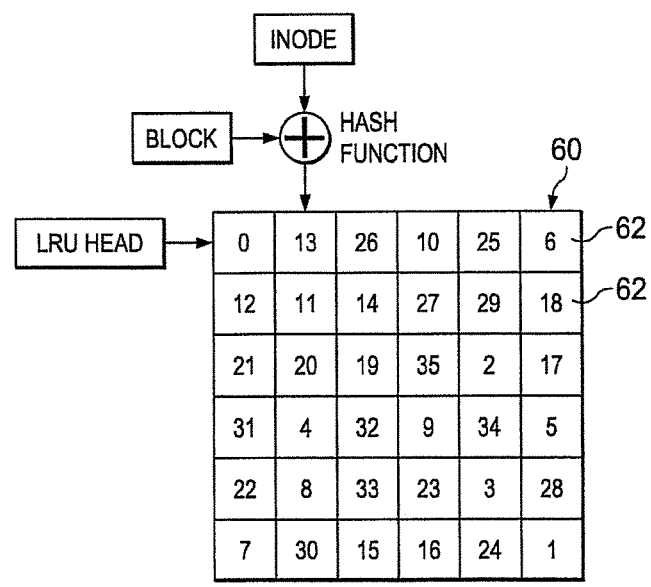
FIG. 9 illustrates a cache of data blocks and/or log blocks used to speed up read performance, according to this disclosure.

To speed up read performance, a cache 60 of data blocks and/or log blocks 62 can be used, such as shown in FIG. 9. The blocks 62 may represent various data blocks 54 and/or log blocks 56 of FIG. 4. The operation of the cache 60 is as follows. Each block 62 is on three linked lists: a least recently used (LRU) list, a list of its segment 50, and a hash table bucket list. When a block 62 is needed, the hash table is used to find out if the block 62 is in the cache 60. When the cache 60 needs to evict a block 62, if the block 62 has not changed, the cache 62 simply disposes the content of the block 62. If the block 62 needs to be appended, the cache 60 appends all of the preceding segments 50 and this segment. When picking a block 62 to evict, the cache 60 picks the oldest block 62 that has not changed, or has changed and belongs to a complete segment 50.

State Transitions of the on Disk Data Structures

User actions trigger atomic state transitions of the on-disk structures shown in FIG. 3 and previously described. The valid state transitions include:
1) Append a data block 54 to the tail of the circular linked list 42.
2) Remove an empty data band 16 from the head of the circular linked list 42 and add it to the tail of a file's linked list.
3) Remove an empty data band from the head of a file's linked list and move it to the head of the circular link list 42.
4) Move a data block 54, belonging to a file, from a source data band to a destination data band.
5) Mark a data block 54 of a file as invalid.
6) Allocate an i-node.
7) De-allocate an i-node.
8) Allocate a single linked list 58.
9) De-allocate a single linked list 58.
10) Disassociate a file from a shared single linked list 58.
11) Associate a file with a shared single linked list 58.

Each of the above transition types is associated with a journal entry type, as described previously. The atomicity of the implementation of each of the above transitions is accomplished by first appending the affected data, then, the whole transition is completed by making changes to the control data structures. The control data structures that are affected by the transition are locked down. Changes are made to the in-memory copy of the control data structure, and a journal entry is logged to atomically commit the transition asynchronously. Data blocks 54 appended to the tail of the circular linked list 42 are serialized because a data band is not written to until any preceding writes have completed.

The processing of each state transition is described in the following sections. These descriptions illustrate that these transitions could indeed be atomic, and that the validity of a sequence of processing steps can be verified by confirming a legal interleaving of processing of these transitions. The operations below are described as being performed by the processor 12. However, it will be understood that the operations may be performed by another suitable device or system.

Append a Data Block to the Tail of the Circular Link List

A data block 54 can be appended to the tail of the circular linked list 42 by performing the following operations. The processor 12 locks down the i-node and tail of the circular linked list 42. If the current segment 50 has enough space or the current data band is not full, the processor 12 appends the data block 54 to it, marks the data block as valid, logs a journal entry, and unlocks the data structures. The process then returns. If there are empty data bands, the processor 12 advances the tail of the circular linked list. Then, the processor 12 issues an I/O to append, marks the data block as valid, logs a journal entry, and unlocks the data structures. The process then returns. If there are no empty data bands, the processor 12 awakens the compaction thread, and unlocks data structures. The compaction thread then goes to sleep, and the process is retried.

Remove an Empty Data Band from the Head of the Circular Link List and Add it to the Tail of a File's Link List An empty data band 16 can be removed from the circular linked list 42 by performing the following operations. The processor 12 locks the i-node of the file, locks the head of the circular linked list, delinks the data band at the head of the circular linked list, and adds it to the tail of the file's linked list. Then, the processor 12 logs a journal entry, unlocks the head of the circular linked list, and unlocks the i-node.

Remove an Empty Data Band from the Head of a File's Linked List and Move it to the Head of the Circular Linked List.

An empty data band 16 can be removed from the head of the file's linked list and moved to the head of the circular linked list 42 by performing the following operations. The processor 12 locks the i-node of the file, locks the shared single linked list 58, and locks the head of the circular linked list. Then, the processor 12 delinks the data band at the head of the file's linked list and adds it to the head of the circular linked list. Then, the processor 12 logs a journal entry, unlocks the head of the circular linked list, unlocks the single linked list 58, and unlocks the i-node.

Move a Data Block, Belonging to a File, from a Source Data Band to a Destination Data Band.

A data block 54 belonging to a file can be moved from a source data band to a destination data band by performing the following operations. The processor 12 locks the i-node of the file, appends the data block to the destination data band, and marks the source data block as invalid and marks the destination data block as valid in the space management data structure. Then, the processor 12 logs a journal entry, and unlocks the i-node of the file.

Mark a Data Block of a File as Invalid

A data block 54 of a file can be marked as invalid by performing the following operations. The processor 12 locks the i-node of the file, marks the data block as invalid in the space management data structure, logs a journal entry, and locks the i-node of the file.

Allocate an i-Node

An i-node can be allocated by performing the following operations. The processor 12 finds a free i-node, locks the i-node, and verifies that the i-node is free. If the i-node is not free, the processor 12 unlocks the i-node is unlocked and the process goes back to the beginning. Otherwise, the processor 12 initializes the content of the i-node, logs a journal entry, and unlocks the i-node.

De-Allocate an i-Node.

An i-node can be de-allocated by performing the following operations. The processor 12 locks the i-node, marks the i-node as free, logs a journal entry, and unlocks the i-node.

Allocate a Single Linked List

A single linked list 58 can be allocated by performing the following operations. The processor 12 finds a free single linked list 58, locks the single linked list 58, and verifies that the single linked list 58 is free. If the single linked list is not free, the processor 12 unlocks the single linked list 58 and the process goes back to the beginning. Otherwise, the processor 12 initializes the content of the single linked list, logs a journal entry, and unlocks the single linked list 58.

De-Allocate a Single Linked List

A single linked list 58 can be de-allocated by performing the following operations. The processor 12 locks the single linked list 58, marks the single linked list 58 as free, logs a journal entry, and unlocks the single linked list 58.

Associate a File with a Shared Single Linked List

A file can be associated with a shared single linked list 58 by performing the following operations. The processor 12 locks the i-node, locks the single linked list 58, and changes the i-node's single linked list 58. Then, the processor 12 increments the reference count of the single linked list 58, logs a journal entry, unlocks the single linked list 58, and unlocks the i-node.

Disassociate a File from a Shared Single Linked List

A file can be disassociated from a shared single linked list 58 by performing the following operations. The processor 12 locks the i-node, locks the single linked list, and changes the i-node's single linked list 58 to NULL. Then, the processor 12 decrements the reference count of the single linked list 58, logs a journal entry, unlocks the single linked list 58, and unlocks the i-node.

Operations of the SMR-Aware Append Only File System

A number of different operations can be performed in the SMR-aware append-only file system 10. Some of these operations include appending a data block 54 to a file, reading a data block from a file, creating a file, deleting a file, compacting the head data band of the circular linked list, merging small files, and opening a file.

Each of the above operations is a transaction issuing a sequence of transitions demarked by the transaction begin and transaction end journal records. The isolation among concurrent operations is provided by locking the elements of the file path array. The processing of each of these operations is described in the following sections. The operations below are described as being performed by the processor 12. However, it will be understood that the operations may be performed by another suitable device or system.

Open a File for Read or Append

To open a file for read and append operations, the processor 12 locks the file path, and finds the i-node of the file.

Append a Data Block to a File

To append a data block 54 to a file, the append-a-data-block transition can be used. It is assumed that the file is open. The processor logs a transaction begin journal record, and issues the append-a-data-block state transition. This atomic transition locks the i-node. Then, the processor 12 logs a transaction end journal record.

Read a Data Block from a File

To read a data block 54 from a file, the following sequence of transitions is issued. It is assumed that the file is open. The processor 12 locks the i-node of the file, and finds the data block in the space management array 32. Then, the processor 12 issues a disk read is issued, unlocks the i-node, and unlocks the file path.

Create a File

To create a file, the following sequence of transitions can be issued. The processor 12 locks the path of the file, logs a transaction begin journal record, allocates an i-node, locks the i-node, and allocates a single linked list 58. The processor 12 associates the file with the single linked list, moves an empty data band from the circular linked list 42 to the single linked list, logs a transaction end journal record, unlocks the i-node, and unlocks the path of the file.

Delete a File

To delete a file, the following sequence of transitions can be issued. The processor 12 locks the path of the file, locks the i-node, locks the shared single linked list 58, and locks a transaction begin journal record. The processor 12 then disassociates the file from its single linked list 58. If the reference count of the single linked list 58 is 0, for each data band on the file's linked list, the processor 12 moves it to the circular linked list 42. The processor 12 marks each of the data blocks 54 as invalid in the space management array entries 32. Then the processor 12 frees the i-node, frees the shared linked list if the reference count is 0, logs a transaction end journal record, unlocks the single linked list, unlocks the i-node, and unlocks the path of the file.

Compact the Head Data Band

Referring to FIG. 8, to compact the head data band, the following sequence of transitions can be issued. The processor 12 logs a transaction begin journal record. For each data block 54 in the head data band, the processor 12 locks its i-node and moves it to the file's linked list 58. If the file's linked list is full, the processor 12 moves an empty data band from the circular linked list 42 to it. The processor 12 then advances the head of the circular linked list, logs an operation end journal record, and unlocks all the i-nodes.

Merge Small Files

To merge small files, the processor 12 scans the i-node array 38 to look for files that have not been appended for a while and whose size is smaller than half of a data band. The processor 12 sorts these files into groups of two or more with each group having a total size less than a single data band. The processor 12 locks the i-nodes of these files to verify that the calculation done in the previous bullet is still valid. If none of the groups is valid, the process returns to the beginning and the processor 12 retries.

For each of the valid groups, the processor 12 locks the i-node of each file in the group, logs a transaction begin journal record, copies the data blocks 54 of these files to the single linked list 58 of the first file in the group, and associates each file with the single linked list of the first file. Then the processor 12 logs a transaction end journal record, and unlocks the i-nodes of the files in the group.

Checkpointing

When the file system log becomes partially full (e.g., at least one-eighth of its capacity is used to hold file data blocks 54 and log blocks), the system 10 is checkpointed by the processor 12. The two checkpoint records 30 alternate to become the current checkpoint. Numerous strategies exist for choosing and marking a checkpoint record, as known in the art. These checkpointing techniques will not be discussed further here.

Recovery

To provide recovery on a restart, the processor 12 initializes the control data structures from the current checkpoint record. The processor 12 then forward scans the circular linked list 42 from the logical block accessing (LBA) in the current checkpoint record redoing each journal entry and computing the state of each transaction. The redo phase ends when reaching the first incomplete segment 50 to arrive at a list of incomplete transactions. For each incomplete transaction, an undo is performed based on the journal entry type.

Care is taken to make sure that compaction does not delete journal entries of active transactions. This could happen when the processor 12 compacts the data bands that contain the journal blocks pointed by the LBA in the checkpoint record. When this happens, the compaction can wait for a new round of checkpointing to complete.

The undo of a journal entry by the processor 12 relies on an assumption that since linked lists are always appended to the circular linked list 42 or the linked lists of the files, an undo would restore the tail of the lists. This assumption could be false when undoing a file delete, since the data bands of the file are put on the circular link list and could be reused and overwritten. Thus, these data bands are marked during delete and unmarked after the delete operation finishes. The above assumption could also be false when undoing a compaction of the head of the circular linked list, since the data band could have been re-used and overwritten. Thus, the data band is marked during compaction and unmarked after the compaction commits The characteristics of the write pointer can affect recovery, as illustrated by the following example. A data block 54 is appended to a file. During the processing of this request, the processor 12 appends to the tail data band, therefore advancing the write pointer. The processor 12 updates the in-memory control data structures, and logs a journal entry. If the system 10 crashes before the journal entry is written to disk, the write pointer would be advanced, but the data block is marked as invalid in the recovered in-memory control data structures. This lost space would be reclaimed by compaction because compaction only copies valid data blocks.

In-Memory File System Implementation

The SMR-aware append only file system 10, including the set of on-disk structures, atomic state transition of the on-disk structures, and external user triggered operations, serves as the foundation for the design of an in-memory implementation of this file system. The in-memory implementation processing produces a sequence of atomic state transitions that conform to that generated from a sequence of external user triggered operations. In some embodiments, the in-memory, SMR-aware, append-only file system 10 includes all of the same components as the SMR-aware append-only file system 10 of FIG. 1. The components of the in-memory, SMR-aware, append-only file system 10 are described in the following sub-sections.

File System Layout

The first 1-2 percent of the data bands of the file system are random access and include two checkpoint records. One of the two checkpoint records is the current checkpoint. When control data structures are cached, file system recovery loads a consistent file system state from the current checkpoint, then starts the roll-forward and rollback processing.

The remaining data bands are append-only, and they hold data blocks 54 and journal data blocks for the files. These data bands initially are associated with the circular linked list 42. When a new file is created, an empty data band is removed from the circular linked list, and it is put on the single linked list of the file.

In-Memory Data Block Cache

The system 10 maintains a large, in-memory cache of data blocks that generally mirror the state of the data blocks 54 on disk. A block in the in-memory data cache may be in one of the following states: incoming, indicating that the block is being read from disk (in which case its state in memory is invalid); outgoing, indicating that the block is being written to disk (in which case its state on disk is invalid); or valid, indicating that the block's state in memory matches its state on disk.

Corresponding to the first two states are the incoming and outgoing lists, which maintain the lists of disk blocks that are being read from and written to disk, respectively. The incoming and outgoing disk lists are in-memory data structures that comprise doubly linked lists of disk blocks on which disk I/O is scheduled to be performed. The lists include the disk location (logical block address) from/to which the corresponding disk block is to be read/written, as appropriate. Disk blocks in the valid state are maintained in a valid list, which is also doubly-linked and also maintains the LBA of the disk block with which the corresponding disk block is associated. The in-memory data block cache is consulted whenever a disk block is to be read, so that a disk read may be avoided. A hash table is maintained so that a fast lookup of the disk block cache may be made by LBA. A block state table is maintained to indicate the state of each block in the cache and to hold the indexes of the next and previous blocks in whichever list (incoming, outgoing, or valid) a given block may be on. The valid list is maintained so that a LRU "clock" algorithm may determine when to retire a given block from the cache. A given block is moved to the head of the list whenever it is read or written. A block may be removed from the tail of the valid list when space is needed in the cache.

The system 10 differs from the traditional file system cache management in several ways. Since each log entry records only changes to the control data structures, the disk blocks appended by the atomic transition are written out before flushing the log entry. Since data bands are append-only, disk blocks need to be written in the order that they reside in data bands. Also, only data blocks in append-only data bands go through the buffer cache.

The above requirements are accomplished by operations of the cache. Each block is on three linked lists: the LRU list, the list of its segment 50, and the hash table bucket list. When a block is needed, the hash table is used to find out if the block is in the cache. When a block is to be evicted, if the block has not changed, its contents away are simply thrown away. If the block is to be appended, all the preceding segments and this segment are appended. When selecting a data block to evict, the oldest block is selected that has not changed, or has changed and belongs to a complete segment.

The buffer cache supports the following interface calls:
1. BlockHdr *Buf_pin(LBA addr): This call pins a data block 54 with LBA address, addr.
2. Void buf_unpin(BlockHdr *buf): This call unpins a data block 54, buf.
3. BlockHdr *Buf_append(LBA addr, void *data): This call appends and pins a data block 54, whose LBA address is addr, with new content or data.

File System Operations

A number of different operations can be performed in an in-memory file system implementation. The processing of each of these operations is described in the following sections. The operations below are described as being performed by the processor 12. However, it will be understood that the operations may be performed by another suitable device or system.

Create a File

To create a file, the processor 12 performs the same operations as for the "create a file" operation previously described.

Read a Data Block from a File

To read a data block 54 from a file, the following sequence of transitions is issued. The processor 12 locks the path of the file, and locks the i-node of the file. The processor 12 finds the data block in the space management array 32, calls buf_pin( ) to get the block content, and calls buf_unpin( ). Later, the processor 12 unlocks the i-node, and unlocks the file path.

Append a Data Block to a File

To append a data block 54 to a file, the processor 12 locks the file path, logs a transaction begin journal record, and locks down the i-node and tail of the circular linked list. If the current segment 50 has enough space or the current data band is not full, the processor 12 calls buf_append( ), calls buf_unpin( ), marks the data block as valid, logs a journal entry, un-locks the data structures, and returns. If the current segment 50 does not have enough space and there are empty data bands, the processor 12 advances the tail of the circular linked list 42, and then calls buf_append( ), calls buf_unpin( ), marks the data block as valid, logs a journal entry, unlocks data structures, and returns. If there are no empty data bands, the processor 12 wakes up the compaction thread, unlocks data structures, goes to sleep and attempts the process later. The processor 12 also logs a transaction end journal record.

Delete a File

To delete a file, the processor 12 performs the same operations as for the "delete a file" operation as previously discussed.

Initialize the File System

To initialize the file system 10, the processor 12 performs the following operations. Based on the disk's capacity, the processor 12 calculates the size of a checkpoint record. The processor 12 then initializes the control data structures. This includes initializing the circular linked list 42, the space management array 32, the i-node array 38, the array of single linked lists 58, the file path lock table, the transaction control block array 40, the transaction log, and the buffer cache. The processor 12 then resets the write pointers for the append-only data bands 22, and initiates checkpointing. The system 10 is opened to accept user commands after the checkpointing process completes.

File System Startup

The file system 10 startup process may include the following operations. The processor 12 accesses the first data band to determine which checkpoint record is the current one. Then, the processor 12 loads the in-memory space management, data bands, i-node, head/tail of the circular data band linked list 42, and the LBA of the first journal data block 54 from the current checkpoint. Then, the processor 12 performs a roll-forward starting from the first journal data block until reaching the first incomplete segment. Then, the processor 12 performs a roll-back of incomplete transactions, and initiates a checkpoint.

Figure 10:
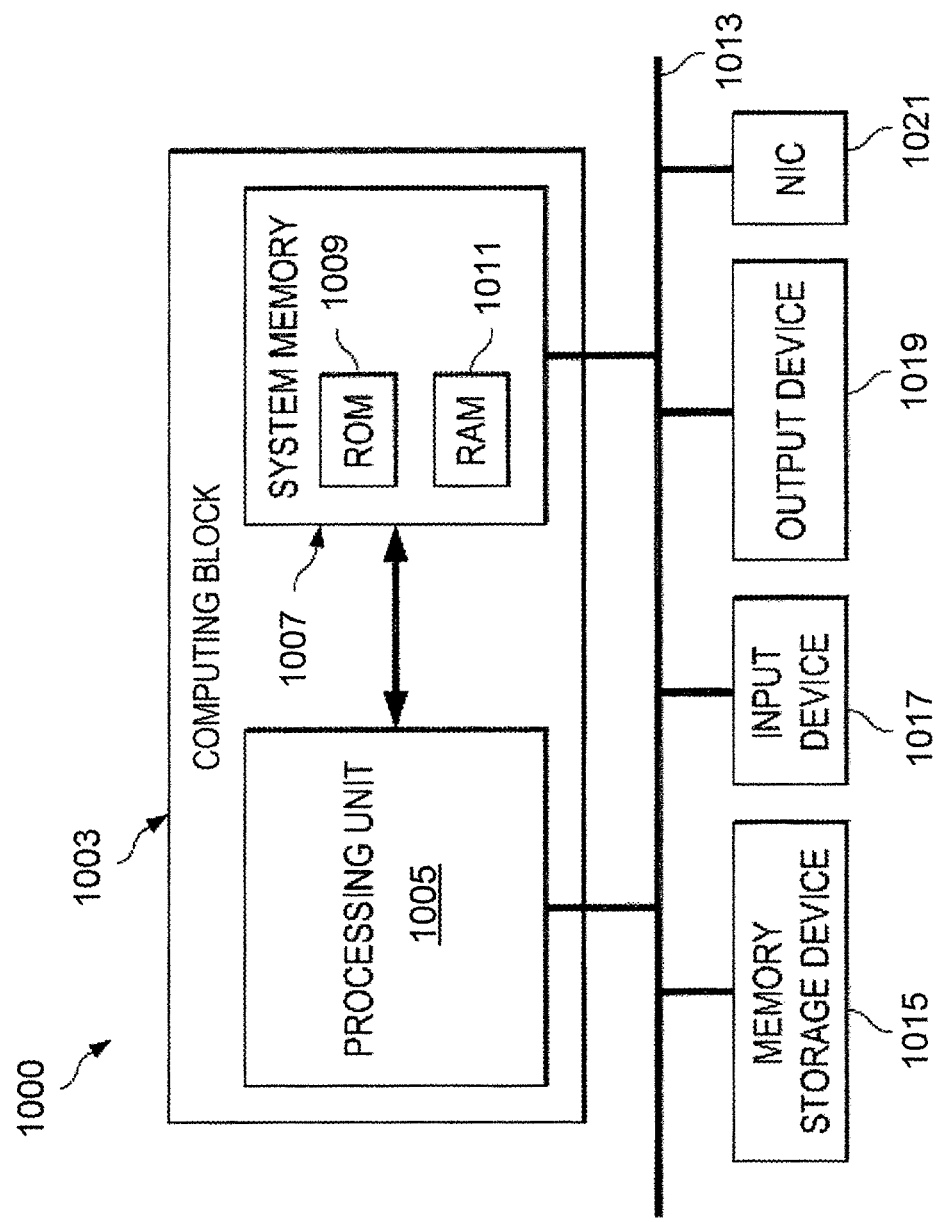
FIG. 10 illustrates a typical, general-purpose network component suitable for implementing one or more embodiments of the components disclosed herein.

The network components described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a computing block 1003 with a processing unit 1005 and a system memory 1007. The processing unit 1005 may be any type of programmable electronic device for executing software instructions, but will conventionally be one or more microprocessors. The system memory 1007 may include both a read-only memory (ROM) 1009 and a random access memory (RAM) 1011. As will be appreciated by those of skill in the art, both the read-only memory 1009 and the random access memory 1011 may store software instructions for execution by the processing unit 1005.

The processing unit 1005 and the system memory 1007 are connected, either directly or indirectly, through a bus 1013 or alternate communication structure, to one or more peripheral devices. For example, the processing unit 1005 or the system memory 1007 may be directly or indirectly connected to one or more additional memory storage devices 1015. The memory storage devices 1015 may include, for example, a "hard" magnetic disk drive, a solid state disk drive, an optical disk drive, and a removable disk drive. The processing unit 1005 and the system memory 1007 also may be directly or indirectly connected to one or more input devices 1017 and one or more output devices 1019. The input devices 1017 may include, for example, a keyboard, a pointing device (such as a mouse, touchpad, stylus, trackball, or joystick), a touch screen, a scanner, a camera, and a microphone. The output devices 1019 may include, for example, a display device, a printer and speakers. Such a display device may be configured to display video images. With various examples of the network component 1000, one or more of the peripheral devices 1015-1019 may be internally housed with the computing block 1003. Alternately, one or more of the peripheral devices 1015-1019 may be external to the housing for the computing block 1003 and connected to the bus 1013 through, for example, a Universal Serial Bus (USB) connection or a digital visual interface (DVI) connection.

With some implementations, the computing block 1003 may also be directly or indirectly connected to one or more network interfaces cards (NIC) 1021, for communicating with other devices making up a network. The network interface cards 1021 translate data and control signals from the computing block 1003 into network messages according to one or more communication protocols, such as the transmission control protocol (TCP) and the Internet protocol (IP). Also, the network interface cards 1021 may employ any suitable connection agent (or combination of agents) for connecting to a network, including, for example, a wireless transceiver, a modem, or an Ethernet connection.

It should be appreciated that the network component 1000 is illustrated as an example only, and it not intended to be limiting. Various embodiments of this disclosure may be implemented using one or more computing devices that include the components of the network component 1000 illustrated in FIG. 10, or which include an alternate combination of components, including components that are not shown in FIG. 10. For example, various embodiments may be implemented using a multi-processor computer, a plurality of single and/or multiprocessor computers arranged into a network, or some combination of both.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

writing, by a processor, data blocks to a disk comprising a plurality of concentric append-only shingled data bands having partially overlapping data tracks, wherein the data bands are associated with a circular linked list having a head data band and a tail data band, the head data band and the tail data band each comprising a plurality of data blocks;

creating, by the processor, a new file, wherein an empty data band of the plurality of data bands is removed from the circular linked list and added to a single linked list of the new file;

appending, by the processor, a new file data block to the tail data band of the circular linked list; and copying, by the processor, when a number of empty data bands in the circular linked list decreases to a predetermined threshold, the data blocks in the head data band of the circular linked list to the single linked list of the new file to free up data blocks of deleted files and obsolete log blocks in the circular linked list.

2. The method as specified in claim 1, further comprising: appending segments of the data bands to the circular linked list and the single linked list sequentially relative to their positions in each of the linked lists.

3. The method as specified in claim 2, wherein the data blocks are written to the disk in an order according to the sequence they appear in the circular linked list.

4. The method as specified in claim 2, wherein modifications to the data blocks and data structures are implemented as transactions.

5. The method as specified in claim 4, wherein a transaction commit journal entry of the transactions resides in a log block that precedes the data bands freed by a transaction in the circular linked list.

6. The method as specified in claim 5, further comprising: putting freed data blocks to just before the head data band of the circular linked list such that the freed data blocks are unlikely to get re-used before a current log block is full.

7. The method as specified in claim 5, wherein undo and redo information is journaled for changes to control data structures, and changes to the segments are not journaled.

8. The method as specified in claim 5, wherein changed data blocks are written out before a corresponding transaction commit journal entry.

9. The method as specified in claim 5, wherein the segments have a fixed size, and the log blocks are flushed asynchronously.

10. A shingled magnetic recording append-only file system, comprising:

a disk comprising a plurality of concentric append-only shingled data bands having partially overlapping data tracks, wherein the data bands are associated with a circular linked list having a head data band and a tail data band, the head data band and the tail data band each comprising a plurality of data blocks; and a processor configured to:

write data blocks to the disk, and create a new file, wherein an empty data band of the plurality of data bands is removed from the circular linked list and added to a single linked list of the new file;

append a new file data block to the tail data band of the circular linked list; and copy, when a number of empty data bands in the circular linked list decreases to a predetermined threshold, the data blocks in the head data band of the circular linked list to the single linked list of the new file to free up data blocks of deleted files and obsolete log blocks in the circular linked list.

11. The system as specified in claim 10, wherein the processor is configured to append segments of the data bands to the circular linked list and the single linked list sequentially relative to their positions in each of the linked lists.

12. The system as specified in claim 11, wherein the processor is configured to write the data blocks to the disk in an order according to the sequence they appear in the circular linked list.

13. The system as specified in claim 11, wherein the processor is configured to implement modifications to the data blocks and data structures as transactions.

14. The system as specified in claim 13, further comprising a transaction commit journal entry of the transactions that resides in a log block that precedes the data bands freed by a transaction in the circular linked list.

15. The system as specified in claim 14, wherein the processor is configured to put freed data blocks to just before the head data band of the circular linked list such that the freed data blocks are unlikely to get re-used before a current log block is full.

16. The system as specified in claim 14, wherein the processor is configured to:

journal undo and redo information for changes to control data structures; and not journal changes to the segments.

17. The system as specified in claim 14, wherein the processor is configured to write out changed data blocks before a corresponding transaction commit journal entry.

18. A shingled magnetic recording append-only file system, comprising:

a disk having a plurality of concentric append-only shingled data bands having partially overlapping data tracks, wherein the data bands are associated with a circular linked list having a head data band and a tail data band, the head data band and the tail data band each comprising a plurality of data blocks; and a processor configured to:

write data blocks to the disk, create a new file, wherein an empty data band of the plurality of data bands is removed from the circular linked list and added to a single linked list of the new file, put freed data blocks to just before the head data band of the circular linked list, and write out changed data blocks before a corresponding transaction commit journal entry.

* * * * *